United States Patent
Shoji et al.

(10) Patent No.: US 10,899,341 B2
(45) Date of Patent: Jan. 26, 2021

(54) BEHAVIOR CONTROL APPARATUS FOR VEHICLE

(71) Applicants: TOYOTA JIDOSHA KABUSHIKI KAISHA, Toyota (JP); ADVICS CO., LTD., Kariya (JP)

(72) Inventors: Takuya Shoji, Susono (JP); Yosuke Hashimoto, Kariya (JP)

(73) Assignees: TOYOTA JIDOSHA KABUSHIKI KAISHA, Toyota (JP); ADVICS CO., LTD., Kariya (JP)

( * ) Notice: Subject to any disclaimer, the term of this patent is extended or adjusted under 35 U.S.C. 154(b) by 282 days.

(21) Appl. No.: 16/038,568

(22) Filed: Jul. 18, 2018

(65) Prior Publication Data

US 2019/0023263 A1 Jan. 24, 2019

(30) Foreign Application Priority Data

Jul. 19, 2017 (JP) ................. 2017-139565

(51) Int. Cl.
*B60W 30/02* (2012.01)
*B60W 10/18* (2012.01)
*B60W 40/114* (2012.01)

(52) U.S. Cl.
CPC ............ *B60W 30/02* (2013.01); *B60W 10/18* (2013.01); *B60W 40/114* (2013.01); *B60W 2510/18* (2013.01); *B60W 2540/30* (2013.01); *B60W 2720/125* (2013.01); *B60W 2720/14* (2013.01)

(58) Field of Classification Search
CPC .... B60W 30/02; B60W 10/18; B60W 40/114; B60W 2540/30; B60W 2510/18; B60W 2720/125; B60W 2720/14

USPC .......................................................... 701/48
See application file for complete search history.

(56) References Cited

U.S. PATENT DOCUMENTS

| 8,712,639 | B2 * | 4/2014 | Lu ...................... | B60G 17/0195 |
| | | | | 701/36 |
| 2001/0007965 | A1 | 7/2001 | Yokoyama et al. | |
| 2010/0056338 | A1 * | 3/2010 | Erban ................. | B60T 8/17555 |
| | | | | 477/203 |
| 2013/0013151 | A1 * | 1/2013 | Schafiyha ........... | B60T 8/17555 |
| | | | | 701/41 |

(Continued)

FOREIGN PATENT DOCUMENTS

| JP | 8-48226 A | 2/1996 |
| JP | 11-348753 A | 12/1999 |
| JP | 2002-173012 A | 6/2002 |

(Continued)

*Primary Examiner* — Yazan A Soofi
(74) *Attorney, Agent, or Firm* — Sughrue Mion, PLLC

(57) ABSTRACT

A behavior control apparatus for a vehicle having a control unit for controlling a braking device and controlling a behavior of a vehicle by controlling braking forces of wheels. When the vehicle is in the non-braking state, the control unit acquires information on a lateral acceleration of the vehicle; calculates, based on the lateral acceleration of the vehicle, a target yaw moment of a feedforward control for reducing a rate of decrease of the vehicle's yaw gain accompanying with an increase in an absolute value of a lateral acceleration of the vehicle, and controls braking forces of the wheels by controlling the braking device so that at least a yaw moment corresponding to the target yaw moment is applied to the vehicle.

3 Claims, 5 Drawing Sheets

(56) References Cited

U.S. PATENT DOCUMENTS

2016/0318509 A1* 11/2016 Rycroft ................. B60T 8/1755
2019/0176812 A1* 6/2019 Hirata ................... B60W 10/08

FOREIGN PATENT DOCUMENTS

| JP | 2009-023404 A | 2/2009 |
| JP | 4886848 B2 | 2/2012 |

* cited by examiner

BEHAVIOR CONTROL APPARATUS FOR VEHICLE

CROSS-REFERENCE TO RELATED APPLICATION

The disclosure of Japanese Patent Application NO. JP2017-139565 filed on Jul. 19, 2017 is incorporated by reference in its entirety.

BACKGROUND

1. Technical Field

The present disclosure relates to a behavior control apparatus for a vehicle such as an automobile.

2. Description of the Related Art

A behavior control apparatus that performs behavior control for stabilizing a turning behavior of a vehicle by controlling braking/driving forces of wheels in a vehicle such as an automobile when stability of the vehicle decreases during turning is well known. For example, Japanese Patent Application Laid-open Publication No. 2002-173012 discloses a behavior control apparatus configured to calculate, based on a deviation between a normative yaw rate of a vehicle and an actual yaw rate of the vehicle, a target acceleration/deceleration and a target yaw moment of the vehicle for stabilizing a turning behavior of the vehicle by reducing the yaw rate deviation, and to control braking forces of wheels so that these targets can be achieved.

When a vehicle falls in an understeer state or an oversteer state, a magnitude of a yaw rate deviation increases. According to the behavior control apparatus described in the above Laid-open Publication, a target acceleration/deceleration and a target yaw moment are calculated as target control amounts of a yaw rate feedback. Then, braking forces of wheels are controlled so that an acceleration/deceleration and a yaw moment of the vehicle become the target acceleration/deceleration and the target yaw moment, respectively, whereby a magnitude of the yaw rate deviation is reduced. Therefore, the vehicle can be stably turned as compared to where the behavior control is not performed.

In such a conventional behavior control apparatus as described in the above Laid-open Publication, when a magnitude of a yaw rate deviation exceeds a control start reference value, braking forces of wheels are controlled by the behavior control, and when the magnitude of the yaw rate deviation becomes less than a control termination reference value, the control of the braking forces of the wheels by the behavior control is terminated. Therefore, even if a stability of the vehicle at turning declines, if a magnitude of the yaw rate deviation does not exceed the control start reference value, braking forces of the wheels are not controlled by the behavior control. Accordingly, it is difficult to start the control of braking forces of the wheels by the behavior control without delay so as to improve the stability of the vehicle at the time of turning without delay in a situation where the stability of the vehicle at the time of turning is deteriorating.

Incidentally, if the control start reference value is made small, the control of braking forces of the wheels by the behavior control can be started at an early stage, but a difference between the control start reference value and the control termination reference value becomes small and a hunting of control of the braking forces of wheels tends to occur. Further, it is easy to determine that a magnitude of a yaw rate deviation exceeds the control start reference value due to a detection error such as an actual yaw rate required for calculating a yaw rate deviation, so that there is a high possibility that the control of braking forces of the wheels by the behavior control is unnecessarily performed.

The inventor of the present application earnestly conducted research to enhance a stability of a vehicle early when turning without requiring that the stability of the vehicle at the time of turning has been deteriorated. As a result, the inventor found out that since a possibility that an understeer state of the vehicle occurs at the time of non-braking turning increases as an absolute value of a lateral acceleration of the vehicle increases, if a yaw moment of the vehicle is controlled by feedforward control based on a lateral acceleration of the vehicle, the understeer prevention control can be started without delay.

SUMMARY

The present disclosure provides a behavior control apparatus for a vehicle which is improved to enhance a stability of a vehicle at the time of non-braking turning at an early stage by controlling braking forces of wheels based on a target yaw moment of a feedforward control based on a lateral acceleration of the vehicle.

According to the present disclosure, a behavior control apparatus for a vehicle is provided which has a braking device configured to independently control braking forces of respective wheels and a control unit that controls the braking device, and is configured to control a behavior of the vehicle by controlling braking forces of the wheels.

The control unit is configured to, when the vehicle is in the non-braking state, to acquire information on a lateral acceleration of the vehicle; to calculate, based on the lateral acceleration of the vehicle, a target yaw moment of a feedforward control for reducing a rate of decrease in a yaw gain of the vehicle accompanying with an increase in an absolute value of a lateral acceleration of the vehicle, and to control braking forces of the wheels by controlling the braking device so that at least a yaw moment corresponding to the target yaw moment is applied to the vehicle.

As will be described in detail later, a yaw gain of a vehicle decreases as an absolute value of a lateral acceleration of the vehicle increases and a rate of decrease of the yaw gain of the vehicle accompanying with an increase in the absolute value of the lateral acceleration of the vehicle increases as the absolute value of the lateral acceleration increases. When the yaw gain of the vehicle becomes small, a yaw rate of the vehicle becomes smaller than a normative yaw rate of the vehicle, and a turning behavior of the vehicle becomes easy to understeer. Therefore, by giving the vehicle a turn assisting yaw moment that increases as an absolute value of a lateral acceleration of the vehicle increases, the possibility that the turning behavior of the vehicle becomes understeer can be reduced.

According to the above configuration, when a vehicle is in the non-braking state, a target yaw moment of a feedforward control for reducing a rate of decrease in a yaw gain of the vehicle accompanying with an increase in an absolute value of a lateral acceleration of the vehicle is calculated based on the lateral acceleration of the vehicle. Further, braking forces of wheels are controlled by controlling the braking device such that at least a turn assisting yaw moment corresponding to the target yaw moment is applied to the vehicle. Therefore, a rate of decrease in a yaw gain of the vehicle accompanying with an increase of an absolute value of a lateral acceleration of the vehicle can be reduced, so that it is possible to reduce the possibility that a turning behavior of the vehicle becomes understeer due to the fact that a yaw rate of the vehicle becomes smaller than a normative yaw rate of the vehicle.

In addition, it is possible to give the vehicle a turn assisting yaw moment that increases as an absolute value of a lateral acceleration of the vehicle increases, without requiring the vehicle to be in an understeer state. Therefore, the understeer prevention control by the turn assisting yaw moment can be started without delay, which enables to effectively reduce the possibility that the turning behavior of the vehicle becomes understeer.

Notably, "yaw gain" in the present application is a gain of a change in yaw rate to a change in a steering angle, that is, a partial differential value of a yaw rate of the vehicle with respect to a steering angle. In the following description, a target yaw moment of the feedforward control for reducing a rate of decrease in a yaw gain of the vehicle accompanying with an increase in an absolute value of a lateral acceleration of the vehicle will be referred to as "ACA target yaw moment". "ACA" is an abbreviation for "Active Cornering Assist".

In one aspect of the present disclosure, the control unit is configured to obtain information on an actual yaw rate of the vehicle, to calculate a normative yaw rate of the vehicle, to calculate a target acceleration/deceleration and a target yaw moment of the vehicle of a feedback control on a yaw rate of the vehicle based on a deviation between the normative yaw rate and the actual yaw rate, to calculate a final target yaw moment as a sum of the target yaw moment of the feedforward control and the target yaw moment of the feedback control, and to calculate target braking control amounts of the wheels based on the target acceleration/deceleration and the final target yaw moment, and to control braking forces of the wheels based on the target braking control amounts.

According to the above aspect, a target acceleration/deceleration and a target yaw moment of the vehicle of a feedback control on a yaw rate of the vehicle are calculated, and a final target yaw moment is calculated as a sum of a target yaw moment of the feedforward control and the target yaw moment of the feedback control. Further, target braking control amounts of the wheels are calculated based on the target acceleration/deceleration and the final target yaw moment, and braking forces of the wheels are controlled based on the target braking control amounts.

Consequently, a yaw moment of the vehicle is controlled based on both the target yaw moment of the feedforward control and the target yaw moment of the feedback control. Accordingly, it is possible to prevent a magnitude of a deviation between a normative yaw rate and an actual yaw rate from becoming excessive due to excessive turn assisting yaw moment corresponding to the target yaw moment of the feedforward control. Therefore, it is possible not only to start the understeer prevention control at the time of turning of the vehicle without delay so that the possibility that the turning behavior of the vehicle becomes understeer can be effectively reduced, but also to effectively prevent the turning behavior of the vehicle from becoming oversteer due to the turn assisting yaw moment.

In another aspect of the present disclosure, left and right front wheels of the vehicle are driving wheels, and the control unit is configured to acquire information on a driving operation amount of a driver, to calculate a guard value that decreases as the driving operation amount of the driver decreases, and to perform guard processing of the target yaw moment of the feedforward control with the guard value so that the target yaw moment of the feedforward control does not exceed the guard value.

As will be described in detail later, in a vehicle in which left and right front wheels are driving wheels, when a braking force is applied to the turning inner front wheel at the time of non-braking turning so that a turn assisting yaw moment is imparted to the vehicle, a lateral force may decrease and an understeer state of the vehicle may rather deteriorate. The fear that a lateral force of a turning inner front wheel is lowered by applying a braking force to the wheel is higher as required driving forces of the front wheels by a driver are smaller and a braking force applied to the turning inner front wheel is larger.

According to the above aspect, a guard value that decreases as the driving operation amount of the driver decreases is calculated and the target yaw moment of the feedforward control is guarded with the guard value so that the target yaw moment of the feedforward control does not exceed the guard value. Since the guard value decreases as the driving operation amount of the driver decreases and as the required driving forces of the front wheels by the driver decrease, the target yaw moment after the guard processing decreases as the required driving forces of the front wheels decrease. Therefore, as required driving forces of the front wheels are smaller, the target yaw moment after the guard process is made smaller, and it is possible to reduce the possibility that the degree of understeer of the vehicle is rather increased due to the fact that a lateral force of the turning inner front wheel is lowered by applying a braking force to the turning inner front wheel.

Further, in another aspect of the present disclosure, the control unit is configured to obtain information on an actual yaw rate of the vehicle, to calculate a normative yaw rate of the vehicle, to calculate a target acceleration/deceleration and a target yaw moment of the vehicle of a feedback control on a yaw rate of the vehicle based on a deviation between the normative yaw rate and an actual yaw rate, to calculate a final target yaw moment as a sum of the target yaw moment of the feedback control and the target yaw moment after the guard processing of the feedforward control, and to calculate, based on the target acceleration/deceleration and the final target yaw moment, target braking control amounts of the wheels, and to control braking forces of the wheels based on the target braking control amounts.

According to the above aspect, a target acceleration/deceleration and a target yaw moment of the vehicle on a yaw rate of the vehicle are calculated, and a final target yaw moment is calculated as a sum of the target yaw moment of the feedback control and the target yaw moment after the guard processing of the feedforward control. Further, target braking control amounts of wheels are calculated based on the target acceleration/deceleration and the final target yaw moment, and braking forces of the wheels are controlled based on the target braking control amounts.

Consequently, a yaw moment of the vehicle is controlled based on both the target yaw moment of the feedback control and the target yaw moment after the guard processing of the feedforward control. Therefore, it is possible to prevent a magnitude of a deviation between the normative yaw rate and an actual yaw rate from becoming excessively large due to excessive turn assisting yaw moment corresponding to the target yaw moment after the guard process of the feedforward control. Therefore, as required driving forces of the front wheels are smaller, the target yaw moment after the guard processing is made smaller, and it is possible to reduce the possibility that the degree of understeer of the vehicle is rather increased due to the fact that a lateral force of the turning inner front wheel is lowered by applying a braking force to the turning inner front wheel.

Other objects, other features and attendant advantages of the present disclosure will be readily understood from the description of the embodiments of the present disclosure described with reference to the following drawings.

DETAILED DESCRIPTION

[Principle of Present Disclosure Adopted in Embodiment]

Prior to describing an embodiment, the principle of the behavior control in the present disclosure will be described so as to facilitate understanding of the present disclosure.
<Cornering Force and Cornering Power>

Figure 5:
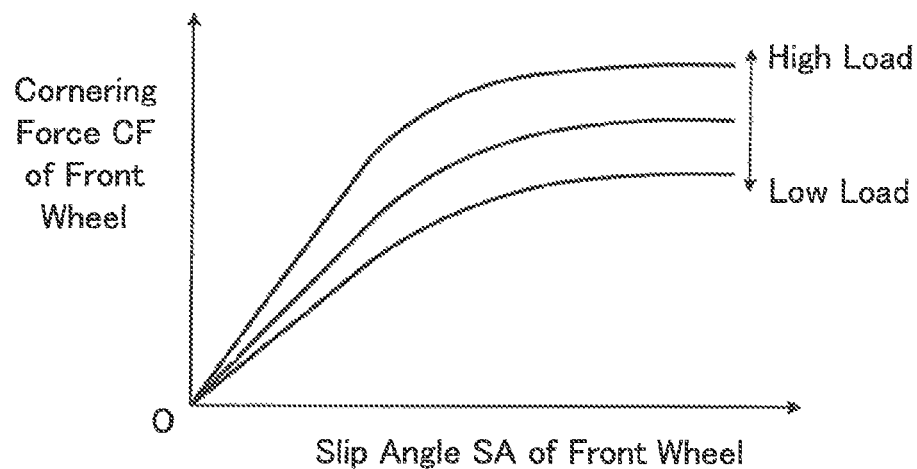
FIG. 5 is a graph showing a relationship between a slip angle SA of a front wheel, a cornering force CF of the front wheel, and a supporting load of the front wheel.

Generally, there is a relationship shown in FIG. 5 between a slip angle SA of a front wheel and a cornering force CF of the front wheel. The cornering power CP of the front wheel increases as the slip angle SA increases, except for a region where the slip angle SA of the front wheel is very large not shown in FIG. 5. A cornering power CP of a front wheel which is a slope of the curve shown in FIG. 5 is a constant value in a region where a slip angle SA of the front wheel is small, but in the region where the slip angle SA of the front wheel is large, the cornering power CP of the front wheel decreases as a slip angle of the front wheel increases. Further, the cornering force CF and the cornering power CP decrease as a supporting load of the front wheel decreases.
<Load Movement in Lateral Direction>

As well known, when a vehicle turns, centrifugal force acts on the vehicle, so that lateral load movement occurs to the outer turning side of the turn, so that a supporting load of the turning inner wheel decreases and a supporting load of the turning outer wheel increases. The larger an absolute value of a lateral acceleration Gy is, the larger a load movement amount in the lateral direction is. The cornering force CF and the cornering power CP decrease due to a decrease in the supporting load in the front wheel on the cornering inner side and increase due to an increase in the supporting load in the front wheel on the cornering outer side.

The relationship between a supporting load of a wheel and a cornering force CF and a cornering power CP is nonlinear and a rate of decrease of the cornering force CF and the cornering power CP with decreasing a supporting load of the wheel increases as the supporting load of the wheel decreases. As a result, even if a decreasing amount of the supporting load of the turning inner wheel and an increasing amount of the supporting load of the turning inner wheel are the same, an amount of decrease of the cornering force CF and the cornering power CP in the turning inner front wheel is larger than the increase amount of the cornering force CF and the cornering power CP in the turning outer front wheel. Therefore, a sum of the cornering forces CF and a sum of the cornering powers CP of the left and right front wheels become smaller as an absolute value of a lateral acceleration Gy becomes larger.
<Yaw Gain>

An absolute value of a lateral acceleration Gy of a vehicle increases as a turning radius of the vehicle decreases and a slip angle SA increases as the turning radius of the vehicle decreases. Consequently, the slip angle SA increases as the absolute value of the lateral acceleration Gy of the vehicle increases. A yaw gain of the vehicle (a partial differential value $\partial YR/\partial MA$ of a yaw rate YR of the vehicle with respect to a steering angle MA) decreases as a cornering force OF and a cornering power CP decrease. Consequently, as indicated by the solid line in FIG. 6, a yaw gain $\partial YR/\partial MA$ of the vehicle decreases as an absolute value of a lateral acceleration Gy of the vehicle increases. Furthermore, a rate of decrease of a yaw gain $\partial YR/\partial MA$ of the vehicle accompanying with an increase in an absolute value of a lateral acceleration Gy of the vehicle increases as an absolute value of the lateral acceleration Gy increases.
<Understeer of Vehicle>

When an absolute value of a lateral acceleration Gy of the vehicle increases and a yaw gain $\partial YR/\partial MA$ of the vehicle decreases, a yaw rate YR of the vehicle becomes smaller than a normative yaw rate of the vehicle, and a turning behavior of the vehicle tends to become understeer. Therefore, in order to reduce the possibility that the turning behavior of the vehicle becomes understeer as an absolute value of a lateral acceleration Gy of the vehicle increases, for example as shown by the broken line in FIG. 6, it is sufficient to reduce a rate of decrease in a yaw gain $\partial YR/\partial MA$ of the vehicle accompanying with an increase in an absolute value of a lateral acceleration Gy in the region where the absolute value of the lateral acceleration Gy is large. In order to reduce a rate of decrease in a yaw gain $\partial YR/\partial MA$ of the vehicle, in the region where an absolute value of a lateral acceleration Gy of the vehicle is large, it is sufficient to give the vehicle a turn assisting yaw moment that increases as the absolute value of the lateral acceleration Gy increases.
<Turn Assisting Yaw Moment of Vehicle>

Figure 6:
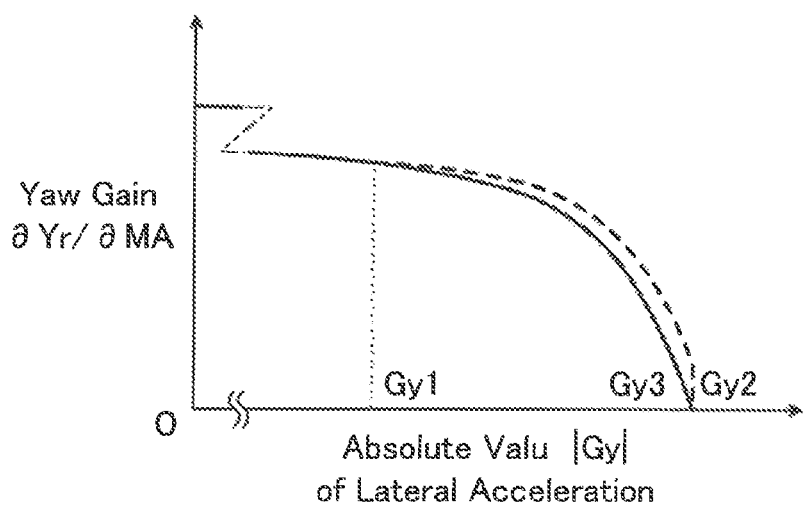
FIG. 6 is a graph showing a relationship between an absolute value of a lateral acceleration Gy of the vehicle and a yaw gain $\partial Yr/\partial MA$ of the vehicle.
Figure 7:
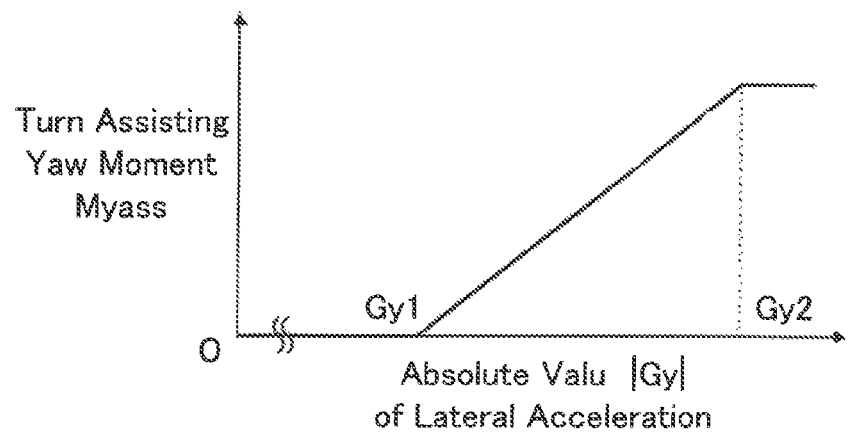
FIG. 7 is a graph showing a relationship between an absolute value of a lateral acceleration Gy of the vehicle and a turn assisting yaw moment Myass.

For example, as indicated by a broken line in FIG. 6, a case is considered where a rate of decrease in a yaw gain $\partial YR/\partial MA$ of the vehicle accompanying with an increase of an absolute value of a lateral acceleration Gy of the vehicle is reduced in a region where the absolute value of the lateral acceleration Gy of the vehicle is equal to or larger than Gy1 smaller than Gy3. In this case, it is sufficient, as shown in FIG. 7, to set a turn assisting yaw moment Myass applied to the vehicle to increase as the absolute value of the lateral acceleration Gy increases in the region where the absolute value of the lateral acceleration Gy of the vehicle is Gy1 or more.

As can be seen from FIG. 6, in the region where the absolute value of the lateral acceleration Gy of the vehicle is larger than Gy3, even if the turn assisting yaw moment Myass is given to the vehicle, the yaw gain ∂YR/∂MA of the vehicle cannot be increased. Therefore, it is sufficient to set the turn assisting yaw moment Myass to increase as an absolute value of a lateral acceleration Gy increases in the region where the absolute value of the lateral acceleration Gy of the vehicle is greater than or equal to Gy1 and less than or equal to Gy2. Notably, Gy 2 is preferably the same as Gy 3, but it may be larger than Gy3 or smaller than Gy3.

However, when Gy2 is smaller than Gy3, in the region where an absolute value of the lateral acceleration Gy of the vehicle is larger than Gy2, since the turn assisting yaw moment Myass is not given to the vehicle, in that region a yaw gain of the vehicle cannot be increased. Conversely, when Gy2 is larger than Gy3, a yaw gain of the vehicle can be increased in the region where an absolute value of a lateral acceleration Gy is greater than or equal to Gy1 but less than Gy2, but in the region where an absolute value of a lateral acceleration Gy is larger than Gy2, a yaw gain of the vehicle cannot be increased.

Therefore, in the behavior control apparatus of the present disclosure, the braking forces of the wheels are controlled so that the turn assisting yaw moment Myass set to increase as an absolute value of a lateral acceleration Gy increases for the region where the absolute value of the lateral acceleration Gy during non-braking of the vehicle is greater than or equal to Gy1 and less than or equal to Gy2. The turn assisting yaw moment Mymass is an ACA target yaw moment of feedforward control for preventing the vehicle from becoming understeer. Accordingly, in the region where an absolute value of a lateral acceleration Gy is large, it is possible to reduce a possibility that the turning behavior of the vehicle is understeer due to a decrease in a yaw gain ∂YR/∂MA of the vehicle.

[Embodiment]

An embodiment of the present disclosure will now be described in detail with reference to the accompanying drawings.

Figure 1:
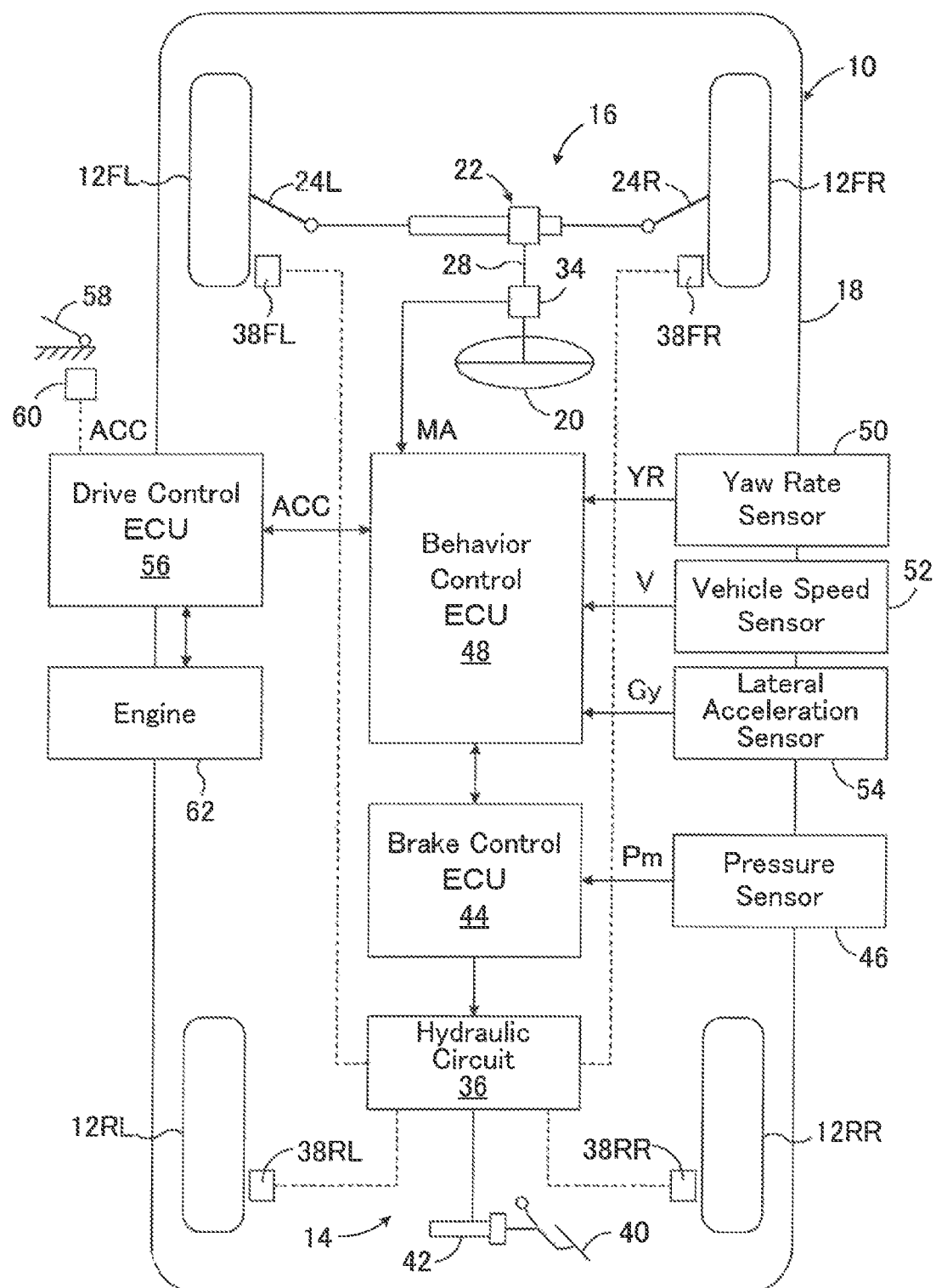
FIG. 1 is a schematic configuration diagram showing an embodiment of a behavior control apparatus for a vehicle according to the present invention.

In FIG. 1, the behavior control apparatus 10 according to the embodiment is applied to a vehicle 18 which includes a braking device 14 that applies braking forces to left and right front wheels 12FL and 12FR and left and right rear wheels 12RL and 12RR, a steering device 16 that steers the left and right front wheels 12FL and 12FR. The left and right front wheels 12FL and 12FR are steered through tie rods 24L and 24R by a rack and pinion device 22 which is driven in response to operation of a steering wheel 20 by a driver.

As shown in FIG. 1, a steering shaft 28 is provided with a steering angle sensor 34 for detecting a rotation angle of the shaft as a steering angle MA. The steering angle sensor 34 detects a steering angle MA by setting a steering angle corresponding to a straight travel of the vehicle 18 to 0 and setting a steering angle in a left turning direction and a steering angle in a right turning direction to a positive value and a negative value, respectively.

The braking device 14 includes a hydraulic circuit 36, wheel cylinders 38FR, 38FL, 38RR and 38RL provided in the wheels 12FL to 12RL, a master cylinder 42 for pressurizing and feeding brake oil in response to a driver's depression operation of a brake pedal 40. Although not shown in detail in FIG. 1, the hydraulic circuit 36 includes a reservoir, an oil pump, various valve devices and the like and functions as a brake actuator.

The pressures in the wheel cylinders 38FL to 38RR are controlled in accordance with a pressure in the master cylinder 42, that is, a master cylinder pressure Pm, the master cylinder being normally driven in response to depression of the brake pedal 40 by the driver. Further, the pressures in the wheel cylinders 38FL to 38RR are controlled regardless of a depression amount of the brake pedal 40 by the driver by means of the oil pump and various valve devices are controlled by a brake control electronic control unit 44 as needed. Therefore, the braking device 14 can independently control the braking forces of the wheels 12FL to 12RL. In the below descriptions and in FIG. 1, the "electronic control unit" is denoted as "ECU".

The master cylinder 42 is provided with a pressure sensor 46 that detects the master cylinder pressure Pm, and a signal indicating the master cylinder pressure Pm detected by the pressure sensor 46 is input to the brake control ECU 44. The brake control ECU 44 controls the braking pressures of the respective wheels, that is, the pressures in the wheel cylinders 38FL to 38RR on the basis of the master cylinder pressure Pm, whereby the braking force of each wheel is controlled according to a depression operation amount of the brake pedal 40, i.e., a braking operation amount of the driver. Further, as will be described in detail later, the brake control ECU 44 controls the braking force of each wheel as needed based on a request from a behavior control ECU 48.

To the behavior control ECU 48, signals indicating a steering angle MA and an actual yaw rate YR of the vehicle are respectively input from the steering angle sensor 34 and a yaw rate sensor 50, and signals indicating a vehicle speed V and a lateral acceleration Gy of the vehicle are respectively input from a vehicle speed sensor 52 and a lateral acceleration sensor 54. Similarly to the steering angle sensor 34, the yaw rate sensor 50 and the lateral acceleration sensor 54 detect a yaw rate YR and a lateral acceleration Gy, respectively by setting a yaw rate and a lateral acceleration corresponding to the straight running of the vehicle 18 to 0 and setting a yaw rate and a lateral acceleration in the left turning direction and the right turning direction to a positive value and a negative value, respectively.

As shown in FIG. 1, the vehicle 18 is provided with a drive control ECU 56. An accelerator opening degree ACC indicating a driving operation amount of the driver is detected by an accelerator opening degree sensor 60 provided on an accelerator pedal 58. A signal indicative of the accelerator opening degree ACC is inputted to the drive control ECU 56, and the drive control ECU normally controls an output of an engine 62 on the basis of the accelerator operation degree ACC. In the embodiment, drive wheels of the vehicle 18 are the left and right front wheels 12FL and 12FR, and the left and right rear wheels 12RL and 12RR are driven wheels. The drive control ECU 56 supplies a signal indicating the accelerator opening degree ACC to the behavior control ECU 48.

When a braking operation is not being performed by the driver, the behavior control ECU 48 calculates a target acceleration/deceleration Gxt and a target yaw moment Myt of the vehicle for reducing a degree of understeer of the vehicle as a feedback control amount for a yaw rate of the vehicle 18. In addition, the behavior control ECU 48 calculates an ACA target yaw moment Myacat of the vehicle as a feedforward control amount for reducing a degree of understeer of the vehicle.

The behavior control ECU 48 calculates a guard processed ACA target yaw moment Myacatg so that the ACA target yaw moment Myacat does not become excessive. The behavior control ECU 48 calculates a final target yaw moment Mytf as a sum Myt+Myacatg of the target yaw moment Myt and the guard processed ACA target yaw moment Myacatg. Further, the behavior control ECU 48 calculates target slip rates Sti (i=fl, fr, rl and rr) of the left and right front wheels and the right and left rear wheels as target braking control amounts of the respective wheels for achieving the final target yaw moment Mytf and the target acceleration/deceleration Gxt, and outputs signals indicating the target slip rates Sti to the brake control ECU 44.

The ECUs 44, 48 and 56 cooperate to function as a control unit for controlling a behavior of the vehicle by controlling the braking device 14 to control braking forces of the wheels. Although not shown in detail in FIG. 1, the ECUs 44, 48 and 56 each include a microcomputer and a drive circuit, and exchanges necessary information mutually via CAN, for example. Each microcomputer has a general configuration in which a CPU, a ROM, a RAM, and an input/output port device are included, and these are mutually connected by a bidirectional common bus. In particular, the ROM of the microcomputer of the behavior control ECU 48 stores a control program corresponding to the flow chart shown in FIG. 2 and a map shown in FIGS. 3 and 4, which will be described later, and the CPU executes the control program, thereby performing the behavior control.

Figure 2:
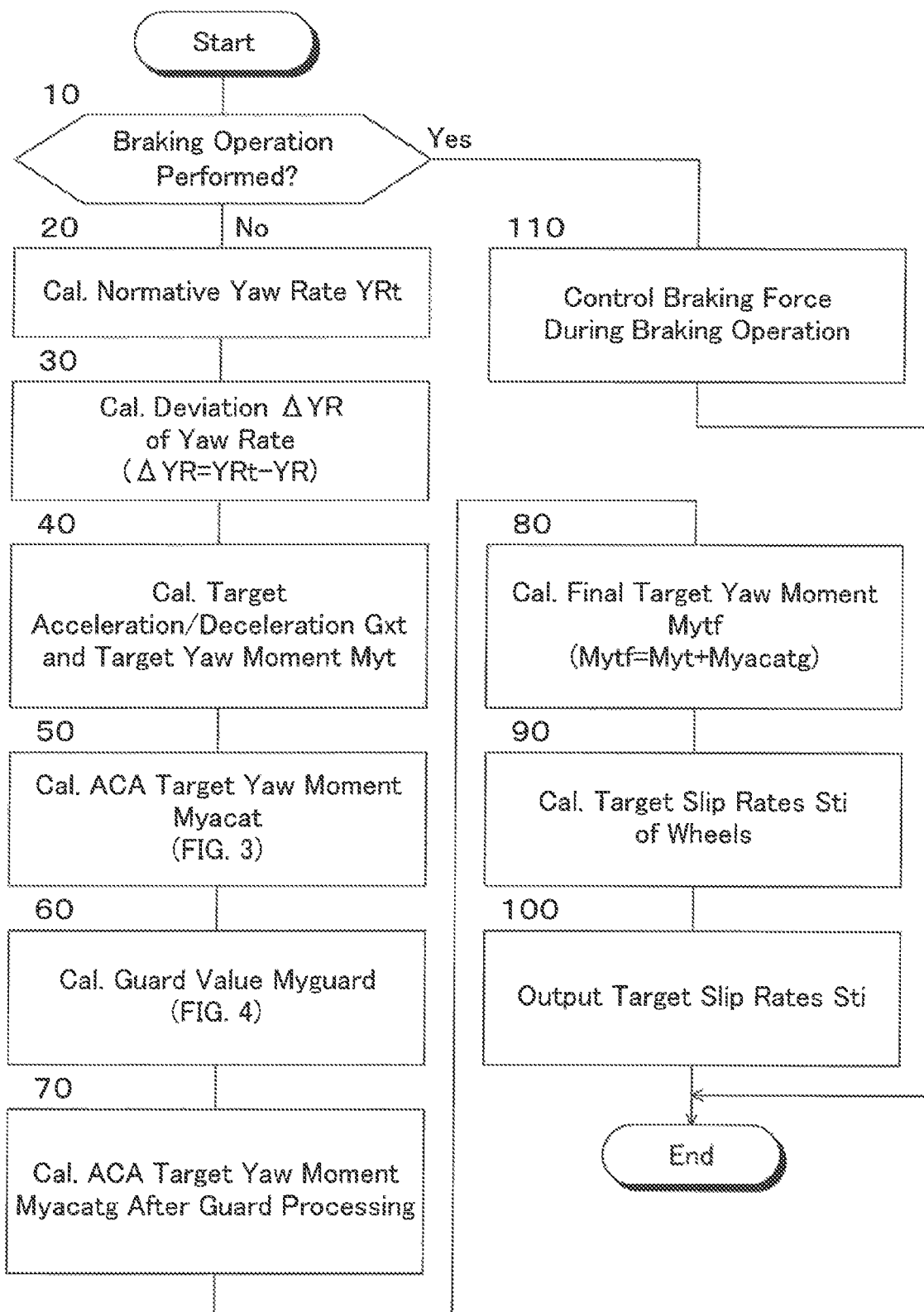
FIG. 2 is a flowchart showing a behavior control routine according to the embodiment.

Next, a behavior control routine in the embodiment will be described with reference to the flowchart shown in FIG. 2. The control according to the flowchart shown in FIG. 2 is repeatedly executed at predetermined time intervals by the behavior control ECU 48 when an ignition switch (not shown) is ON.

First, in step 10, by judging, for example, whether or not a master cylinder pressure Pm detected by the pressure sensor 46 is equal to or larger than a reference value (a positive constant), a determination is made as to whether or not a braking operation is being performed by a driver. When an affirmative determination is made, the behavior control proceeds to step 110, and when a negative determination is made, the behavior control proceeds to step 20. Prior to execution of step 10, reading of a steering angle MA and the like detected by the steering angle sensor 34 and the like is performed.

In step 20, a normative yaw rate YRt of the vehicle 18 is calculated based on a steering angle MA and a vehicle speed V in a manner known in the art.

In step 30, a yaw rate deviation $\Delta$YR is calculated as a deviation YRt-YR between the normative yaw rate YRt and an actual yaw rate YR of the vehicle 18 detected by the yaw rate sensor 50.

In step 40, a target acceleration/deceleration Gxt and a target yaw moment Myt of the vehicle of feedback control for reducing a degree of understeer of the vehicle 18 by reducing an absolute value of the yaw rate deviation $\Delta$YR in the manner known in the art based on the yaw rate deviation $\Delta$YR are calculated. Notably, when an absolute value of the yaw rate deviation $\Delta$YR is equal to or less than a control start reference value $\Delta$YR1 (a positive constant), since it is unnecessary to control the braking forces of the wheels by the behavior control, the target acceleration/deceleration Gxt and the target yaw moment Myt are calculated to zero.

Further, when an absolute value of the yaw rate deviation $\Delta$YR exceeds the control start reference value $\Delta$YR1 and then becomes equal to or less than a control end reference value $\Delta$YR2 (a positive constant smaller than $\Delta$YR1), the target acceleration/deceleration Gxt and the target yaw moment Myt are calculated to zero.

Figure 3:
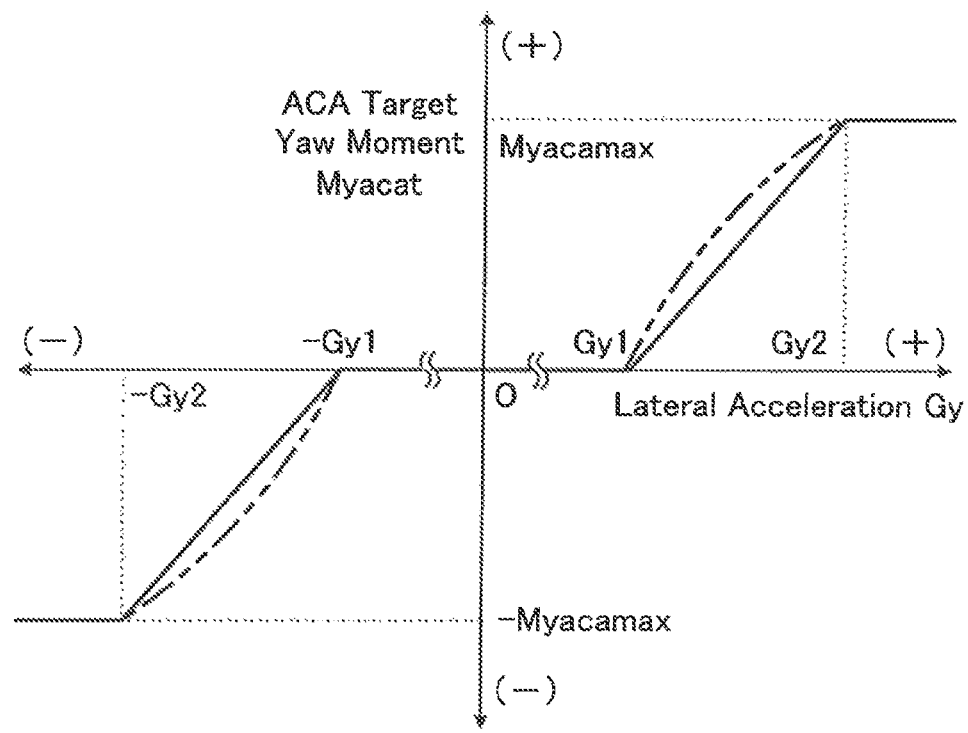
FIG. 3 is a diagram showing a map for calculating an ACA target yaw moment Myacat based on a lateral acceleration Gy of the vehicle.

In step 50, an ACA target yaw moment Myacat is calculated by referring to the map indicated by the solid line in FIG. 3 based on a lateral acceleration Gy of the vehicle 18 detected by the lateral acceleration sensor 54. The ACA target yaw moment Myacat is the target yaw moment of a feedforward control for reducing a rate of decrease in a yaw gain $\partial YR/\partial MA$ of the vehicle due to an increase in an absolute value of the lateral acceleration Gy of the vehicle. The map shown in FIG. 3 is obtained in advance for each type of vehicle as a turn assisting yaw moment for reducing a possibility of the vehicle being in an understeer state, and is stored in the ROM of the microcomputer of the behavior control ECU 48.

As shown in FIG. 3, an absolute value of the ACA target yaw moment Myacat is zero when an absolute value of a lateral acceleration Gy is less than or equal to a first reference value Gy1 (a positive constant), and is the maximum value Myacamax (a positive constant) when an absolute value of the lateral acceleration Gy is equal to or larger than a second reference value Gy2 which is larger than the first reference value Gy1. Further, when an absolute value of the lateral acceleration Gy is larger than the first reference value Gy1 and smaller than the second reference value Gy2, the absolute value of the ACA target yaw moment Myacat increases as the absolute value of the lateral acceleration Gy increases. The absolute value of the ACA target yaw moment Myacat may be zero when an absolute value of the lateral acceleration Gy is larger than the second reference value Gy2.

Figure 4:
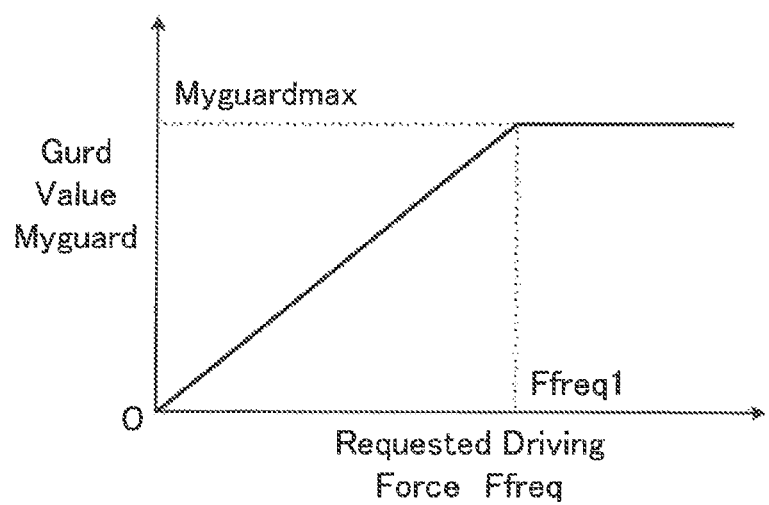
FIG. 4 is a diagram showing a map for calculating a guard value Myguard based on a requested driving force Ffreq of a driver.

In step 60, a signal indicating a driving force Ffreq of the left and right front wheels 12FL and 12FR required by the driver calculated by the drive control ECU 56 based on an accelerator opening degree ACC detected by the accelerator opening degree sensor 60 is read. Further, a guard value Myguard is calculated by referring to the map shown in FIG. 4 based on a requested driving force Ffreq. The map shown in FIG. 4 is a map of the guard value for limiting the ACA target yaw moment Myacat so as to prevent a lateral force of the turning inner front wheel from being lowered due to a braking force applied to the turning inner front wheel in order to reduce a degree of understeer of the vehicle. The map is obtained in advance for each type of vehicle and is stored in the ROM of the microcomputer of the behavior control ECU 48.

As shown in FIG. 4, the guard value Myguard is zero when a requested driving force Ffreq is zero, and becomes the maximum value Myguardmax (a positive constant) when a requested driving force Ffreq is greater than or equal to a reference value Ffreq1 (a positive constant). Further, when a required driving force Ffreq is larger than zero and smaller than the reference value Ffreq1, the guard value Myguard increases as a required driving force Ffreq increases.

In step 70, the ACA target yaw moment Myacat is guarded with the guard value Myguard so that an absolute value of the ACA target yaw moment Myacat does not exceed the guard value Myguard to calculate an ACA target yaw moment Myacatg after the guard processing.

In step 80, a final target yaw moment Mytf is calculated as a sum Myt+Myacatg of the target yaw moment Myt calculated in step 40 and the guarded ACA target yaw moment Myacatg calculated in step 70.

In step 90, target braking slip rates Sti are calculated as target braking control amounts of the left and right front wheels and the right and left rear wheels for achieving the final target yaw moment Mytf of the vehicle and the target acceleration/deceleration Gxt of the vehicle. Incidentally, the calculation of a target slip rates Sti may be carried out in the manner described in Japanese Patent Application Laid-Open Publication No. H11-348753 filed by the present applicant.

In step 100, a signal indicating the target braking slip rates Sti are output to the braking control ECU 44. Upon receiving the signal indicating the target braking slip rates Sbi, the braking control ECU 44 controls the braking pressures so that braking slip rates of the wheels become the associated target braking slip rates Sti, so that the braking forces of the wheels are controlled to target braking forces corresponding to the target braking slip rates Sti.

In step 110, a braking pressure of each wheel is controlled based on a master cylinder pressure Pm detected by the pressure sensor 46, so that a braking force of each wheel becomes a braking force corresponding to the master cylinder pressure Pm. Notably, even when braking operation is performed by the driver, a behavior control during braking may be performed. For example, steps 20 to 40 are executed to calculate a target acceleration/deceleration Gxt and a target yaw moment Myt of the vehicle, and to calculate target braking slip rates Sti of the wheels for achieving the target acceleration/deceleration Gxt and the target yaw moment Myt, and a signal indicating the target braking slip rates Sti may be outputted to the braking control ECU 44. Further, the behavior control when the braking operation is performed by the driver may be performed in any manner known in the art.

As understood from the above description, when the vehicle 18 is not braked, a negative determination is made in step 10, and steps 20 to 100 are executed, so that the turning behavior control of the vehicle in the non-braking state is performed. That is, in steps 20 and 30, a yaw rate deviation $\Delta YR$ is calculated as a deviation YRt-YR between a normative yaw rate YRt of the vehicle 18 and an actual yaw rate YR of the vehicle. In step 40, a target acceleration/deceleration Gxt and a target yaw moment Myt of the vehicle of feedback control for reducing a degree of understeer of the vehicle are calculated based on the yaw rate deviation $\Delta YR$. In step 50, an ACA target yaw moment Myacat of feedforward control for reducing the degree of understeer of the vehicle is calculated based on a lateral acceleration Gy of the vehicle 18.

In step 60, a guard value Myguard is calculated based on a driver's requested driving force Ffreq of the front wheels, and in step 70, the guard processing is performed so that an absolute value of the ACA target yaw moment Myacat does not exceed the guard value Myguard, to calculate an ACA target yaw moment Myacatg after the guard processing. In step 80, a final target yaw moment Mytf is calculated as a sum Myt+Myacatg of the target yaw moment Myt and the guard processed ACA target yaw moment Myacatg. Further, in steps 90 and 100, braking forces of the wheel are controlled so that an acceleration/deceleration of the vehicle 18 and a yaw moment applied to the vehicle become the target acceleration/deceleration Gxt and the final target yaw moment Mytf of the vehicle, respectively.

The target yaw moment Myt calculated in step 40 is a turn assisting yaw moment of feedback control for reducing a degree of understeer of the vehicle. When an absolute value of a yaw rate deviation $\Delta YR$ is equal to or less than the control starting reference value $\Delta YR1$, the target yaw moment Myt becomes zero. Therefore, in the conventional behavior control in which the turn assisting yaw moment for reducing a degree of understeer of a vehicle is only the turn assisting yaw moment of the feedback control, no turn assisting yaw moment is applied to the vehicle when an absolute value of the yaw rate deviation $\Delta YR$ is less than or equal to the control start reference value $\Delta YR1$. In other words, if an absolute value of the yaw rate deviation $\Delta YR$ does not exceed the control start reference value $\Delta YR1$, a degree of understeer of the vehicle cannot be reduced by the turn assisting yaw moment.

In contrast, an ACA target yaw moment Myacat calculated in step 40 is a turn assisting yaw moment of feedforward control for reducing a degree of understeer of a vehicle. When an absolute value of a lateral acceleration Gy is larger than the first reference value Gy1, the ACA target yaw moment Myacat is calculated such that it increases as an absolute value of the lateral acceleration Gy increases. An ACA target yaw moment Myacatg after the guard processing calculated in step 70 is a value guarded such that an absolute value of the ACA target yaw moment Myacat does not exceed the guard value Myguard.

A final target yaw moment Mytf (=Myt+Myacatg) calculated in step 80 is a sum of the target yaw moment Myt and the guarded ACA target yaw moment Myacatg. The target yaw moment Myt is a turn assisting yaw moment of feedback control for reducing a degree of understeer of the vehicle. The ACA target yaw moment Myacatg after the guard processing is a value obtained by guard processing an ACA target yaw moment Myacat which is a turn assisting yaw moment of the feedforward control for reducing a degree of understeer of the vehicle with the guard value Myguard.

Therefore, according to the embodiment, even if an absolute value of a yaw rate deviation $\Delta YR$ is equal to or less than the control start reference value $\Delta YR1$, when an absolute value of a lateral acceleration Gy is larger than the first reference value Gy1, a turn assisting yaw moment corresponding to the ACA target yaw moment Myacatg after the guard processing can be applied to the vehicle. Therefore, as compared to the conventional behavior control, it is possible to effectively start understeer prevention control at the time of turning of the vehicle without delay and reduce the possibility that a turning behavior of the vehicle becomes understeer.

As described above, if the control start reference value $\Delta YR1$ in step 40 is made smaller, the control of the braking forces of the wheels by the feedback control can be started earlier. However, a difference between the control start reference value $\Delta YR1$ and the control end reference value $\Delta YR2$ becomes small, and hunting of the control of the braking forces of the wheels by the understeer prevention control tends to occur. Further, it is likely to be determined that a magnitude of the yaw rate deviation $\Delta YR$ has become equal to or greater than the control start reference value $\Delta YR1$ due to a detection error such as an actual yaw rate YR necessary for calculating the yaw rate deviation. Therefore, the possibility becomes high that the braking forces of the wheels are controlled unnecessarily by the understeer prevention control.

According to the embodiment, the control start reference value $\Delta YR1$ need not made small, and an ACA target yaw moment Myacatg after the guard processing which is a turn assisting yaw moment of the feedforward control makes it possible to start the control of the braking forces of the wheels by the understeer prevention control without delay. Therefore, it is possible to avoid easily occurring of hunting in control of the braking forces of the wheels by the understeer prevention control due to reducing the control start reference value $\Delta YR1$ and it can be avoided that the possibility of unnecessary control of the braking forces of the wheels by the understeer prevention control is increased.

Further, according to the embodiment, a target acceleration/deceleration Gxt and a target yaw moment Myt of the vehicle of feedback control on the yaw rate YR of the vehicle are calculated, and a final target yaw moment Mytf is calculated as a sum of the target yaw moment Myt and the target yaw moment Myacatg after the guard processing of the feedforward control. Further, target braking slip rates Sti as target braking control amounts of the wheels are calculated based on the target acceleration/deceleration Gxt and the final target yaw moment Mytf, and the braking forces of the wheels are controlled based on the target braking slip rates.

Thus, the braking forces of the wheels are feedback-controlled with respect to the yaw rate YR of the vehicle based on the target acceleration/deceleration Gxt and the target yaw moment Myt of the vehicle of feedback control on the yaw rate YR of the vehicle. Accordingly, it can be prevented that a magnitude of a deviation $\Delta YR$ between the normative yaw rate and an actual yaw rate becomes excessive due to an excessive turn assisting yaw moment corresponding to the target yaw moment Myacatg after the guard processing of the feedforward control. Therefore, it is possible not only to start the understeer prevention control at the time of turning of the vehicle without delay so that the possibility that the turning behavior of the vehicle becomes understeer can be effectively reduced, but also to effectively prevent the turning behavior of the vehicle from becoming oversteer due to the turn assisting yaw moment.

Furthermore, according to the embodiment, in step 60, a guard value Myguard is calculated based on driver's requested driving force Ffreq of the front wheels, and in step 70, guard processing is performed so that an absolute value of an ACA target yaw moment Myacat does not exceed the guard value Myguard. Therefore, it is possible to reduce the possibility that the degree of understeer of the vehicle is rather increased due to the fact that braking forces of the wheels are controlled so as to apply a braking force to the turning inner front wheel so that the target acceleration/deceleration Gxt of the vehicle and the final target yaw moment Mytf are achieved, and a lateral force of the wheel is lowered.

Figure 8:
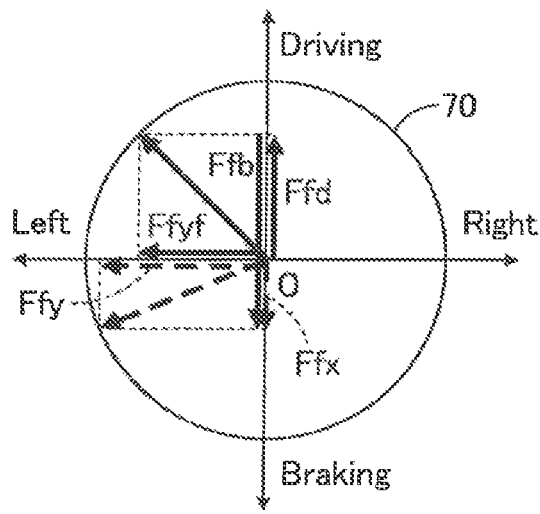
FIG. 8 is a diagram showing a change in lateral force Ffy when a large braking force Ffb is applied to an turning inner front wheel under the situation where a driving force Ffd of the wheel is large.
Figure 9:
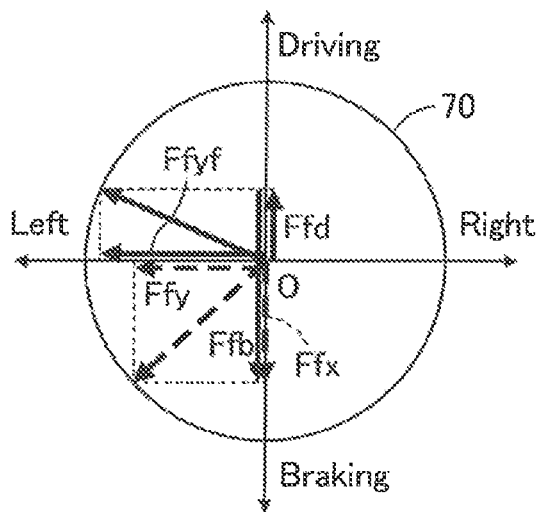
FIG. 9 is a diagram showing a change in lateral force Ffy when a large braking force Ffb is applied to an turning inner front wheel under the situation where a driving force Ffd of the wheel is small.
Figure 10:
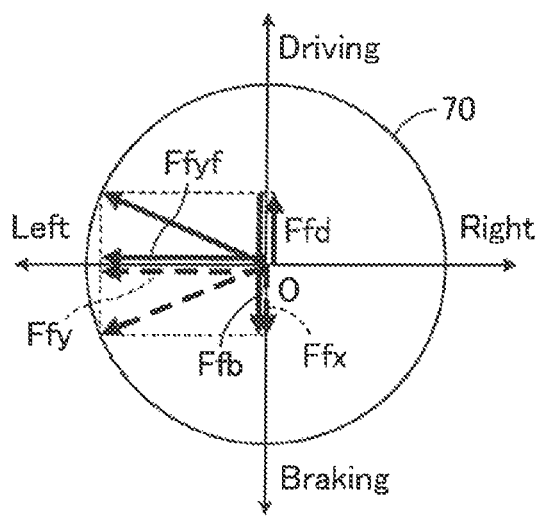
FIG. 10 is a diagram showing a change in lateral force Ffy when a braking force Ffb by the behavior control restricted according to the present disclosure is applied to an turning inner front wheel under the situation where a driving force Ffd of the wheel is small.

For example, FIG. 8 is a diagram showing a change in a lateral force Ffy when a large braking force Ffb is applied to the turning inner front wheel by the understeer prevention control in a situation where a driving force Ffd of the turning inner front wheel corresponding to a required driving force Ffreq of the front wheels by the driver is large. In FIG. 8 and FIGS. 9 and 10 to be described later, reference numeral 70 denotes a friction circle of the turning inner front wheel, the solid line vectors indicate a longitudinal force and a lateral force before the braking force Ffb is applied, and the broken line vectors indicate a longitudinal force and a lateral force when the braking force Ffb is applied. Further, a change in the size of the friction circle due to a load movement accompanying the application of the braking force is omitted.

As shown in FIG. 8, in a situation where a driving force Ffd of the turning inner front wheel is large, when a braking force Ffb larger in magnitude than a driving force Ffd is applied to the wheel, a longitudinal force Ffx of the wheel becomes a braking force. If a magnitude of the braking force Ffb is less than twice a driving force Ffd, a lateral force Ffy of the wheel becomes larger than a lateral force Ffyf before the braking force Ffb is applied to the wheel. Therefore, a degree of understeer of the vehicle does not increase by the reason that a lateral force Ffy decreases due to an application of the braking force Ffb by the behavior control to the wheels.

In contrast, as shown in FIG. 9, in a situation where a driving force Ffd of the turning inner front wheel is small, when a braking force Ffb whose magnitude is greater than twice a driving force Ffd is applied to the wheel, a longitudinal force Ffx of the wheel becomes a braking force and a magnitude of the longitudinal force Ffx becomes larger than the driving force Ffd. Consequently, the braking force Ffb by the behavior control is applied to the wheel, the lateral force Ffy of the wheel becomes smaller than the lateral force Ffyf before the braking force Ffb is applied to the wheel, so that it is inevitable that the degree of understeer of the vehicle rather increases due to a decrease in lateral force.

According to the embodiment, as shown in FIG. 10, in a situation where a driving force Ffd of the turning inner front wheel is small, an ACA target yaw moment Myacat is guarded with a guard value Myguard, whereby a braking force Ffb by the behavior control applied to the turning inner front wheel is reduced. As a result, a magnitude of a longitudinal force Ffx of the turning inner front wheel is reduced. Therefore, as compared with the case of FIG. 9, it is possible to prevent a lateral force Ffy from becoming smaller than the lateral force Ffyf by applying the braking force Ffb by the behavior control to the wheel. Accordingly, it is possible to reduce the possibility that a degree of understeer of the vehicle is rather increased due to a reduction of the lateral force.

As shown in FIG. 4, the guard value Myguard is zero when a required driving force Ffreq is zero, and when a required driving force Ffreq is larger than zero and smaller than the reference value Ffreq1, the guard value increases as the required driving force Ffreq increases. Therefore, when a required driving force Ffreq is large, it is possible to prevent an absolute value of an ACA target yaw moment Myacat from becoming too small, and when a required driving force Ffreq is small, it is possible to guard the ACA target yaw moment Myacat so that an absolute value of the ACA target yaw moment Myacat does not become excessively large.

Although the present disclosure has been described in detail with reference to a specific embodiment, it will be apparent to those skilled in the art that the present disclosure is not limited to the above-described embodiment, and various other embodiments are possible within the scope of the present disclosure.

For example, in the above-described embodiment, in step 60, a guard value Myguard is calculated based on a driver's requested driving force Ffreq of the front wheels, and in step 70, an ACA target yaw moment Myacat is guarded with the guard value Myguard. However, steps 60 and 70 may be omitted. If steps 60 and 70 are omitted, a final target yaw moment Mytf may be calculated as a sum Myt Myacat of the target yaw moment Myt and the ACA target yaw moment Myacat.

Although in the above-described embodiment, the vehicle 18 is a front wheel drive vehicle, the behavior control apparatus 10 of the present disclosure may be applied to a four-wheel drive vehicle or a rear wheel drive vehicle. When a vehicle is a four-wheel drive vehicle or a rear wheel drive vehicle, step 40 and the following steps may be executed when an absolute value of an actual yaw rate YR is smaller than an absolute value of the normative yaw rate YRt. In contrast, when an absolute value of an actual yaw rate YR is greater than an absolute value of the normative yaw rate YRt, oversteer prevention control known in the art may be performed. In particular, when a vehicle is a rear wheel drive vehicle, steps 60 and 70 are omitted and a final target yaw moment Mytf is calculated as a sum Myt+Myacat of the target yaw moment Myt and the ACA target yaw moment Myacat.

In the above-described embodiment, in steps 20 to 40, a target acceleration/deceleration Gxt and a target yaw moment Myt of the vehicle of the feedback control are calculated based on a yaw rate deviation ΔYR which is a deviation between a normative yaw rate YRt of the vehicle 18 and an actual yaw rate YR of the vehicle. However, calculations of a target acceleration/deceleration Gxt and a target yaw moment Myt of the vehicle of the feedback control may be omitted. That is, steps 20 to 40 and 80 may be omitted, and target braking slip rates Sti of the wheels for achieving an ACA target yaw moment Myacatg after the guard processing may be calculated in step 90. Further, steps 20 to 40 and steps 60 to 80 may be omitted, and target braking slip rates Sti of the wheels for achieving an ACA target yaw moment Myacat may be calculated in step 90.

Further, in the above-described embodiment, in step 50, an ACA target yaw moment Myacat is calculated by referring to the map indicated by the solid line in FIG. 3 based on a lateral acceleration Gy of the vehicle 18. In the map shown by the solid line in FIG. 3, when an absolute value of a lateral acceleration Gy is larger than the first reference value Gy1 and smaller than the second reference value Gy2, an absolute value of the ACA target yaw moment Myacat linearly increases as an absolute value of the lateral acceleration Gy increases. However, as shown by the two-dot chain line in FIG. 3, an absolute value of the ACA target yaw moment Myacat may be set to nonlinearly increase as an absolute value of a lateral acceleration Gy increases.

Further, in the above-described embodiment, a guard value Myguard is calculated based on a required driving force Ffreq of the front wheels by the driver in step 60. However, a guard value Myguard may be calculated based on an accelerator opening degree ACC indicating the driving operation amount of the driver so that it decreases as the accelerator opening degree ACC decreases.

What is claimed is:

1. A behavior control apparatus for a vehicle having a braking device configured to independently control braking forces of respective wheels and a control unit that controls the braking device, and configured to control a behavior of the vehicle by controlling braking forces of the wheels, wherein the control unit is configured, when the vehicle is in the non-braking state, to acquire information on a lateral acceleration of the vehicle; to calculate, based on the lateral acceleration of the vehicle, a target yaw moment of a feedforward control for reducing a rate of decrease in a yaw gain of the vehicle accompanying with an increase in an absolute value of a lateral acceleration of the vehicle, and to control braking forces of the wheels by controlling the braking device so that at least a yaw moment corresponding to the target yaw moment is applied to the vehicle, and left and right front wheels of the vehicle are driving wheels, and the control unit is configured to acquire information on a driving operation amount of a driver, to calculate a guard value that decreases as the driving operation amount of the driver decreases, and to perform guard processing of the target yaw moment of the feedforward control with the guard value so that the target yaw moment of the feedforward control does not exceed the guard value.

2. The vehicle behavior control apparatus for a vehicle according to claim 1, wherein the control unit is configured to obtain information on an actual yaw rate of the vehicle, to calculate a normative yaw rate of the vehicle, to calculate a target acceleration/deceleration and a target yaw moment of the vehicle of a feedback control on a yaw rate of the vehicle based on a deviation between the normative yaw rate and the actual yaw rate, to calculate a final target yaw moment as a sum of the target yaw moment of the feedforward control and the target yaw moment of the feedback control, and to calculate target braking control amounts of the wheels based on the target acceleration/deceleration and the final target yaw moment, and to control braking forces of the wheels based on the target braking control amounts.

3. The vehicle behavior control apparatus for a vehicle according to claim 1, wherein the control unit is configured to obtain information on an actual yaw rate of the vehicle, to calculate a normative yaw rate of the vehicle, to calculate a target acceleration/deceleration and a target yaw moment of the vehicle of a feedback control on a yaw rate of the vehicle based on a deviation between the normative yaw rate and an actual yaw rate, to calculate a final target yaw moment as a sum of the target yaw moment of the feedback control and the target yaw moment after the guard processing of the feedforward control, and to calculate, based on the target acceleration/deceleration and the final target yaw moment, target braking control amounts of the wheels, and to control braking forces of the wheels based on the target braking control amounts.

* * * * *